Figure 2:
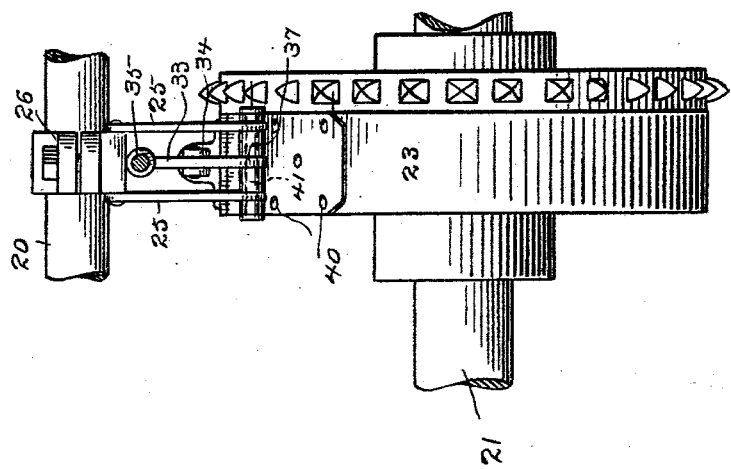

No. 694,785. Patented Mar. 4, 1902.
A. H. RAYMOND.
BRAKE.
(Application filed Nov. 29, 1901.)
(No Model.) 2 Sheets—Sheet 1.

WITNESSES. INVENTOR.
Arthur H. Raymond
By H. W. Wooster
Atty.

No. 694,785. Patented Mar. 4, 1902.
A. H. RAYMOND.
BRAKE.
(Application filed Nov. 29, 1901.)
(No Model.) 2 Sheets—Sheet 2.
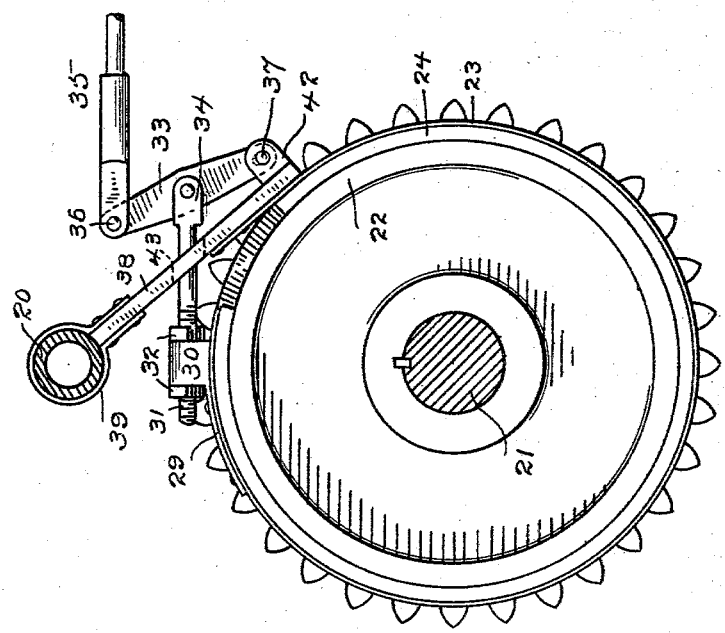

UNITED STATES PATENT OFFICE.

ARTHUR H. RAYMOND, OF BRIDGEPORT, CONNECTICUT.

BRAKE.

SPECIFICATION forming part of Letters Patent No. 694,785, dated March 4, 1902.

Application filed November 29, 1901. Serial No. 84,064. (No model.)

*To all whom it may concern:*

Be it known that I, ARTHUR H. RAYMOND, a citizen of the United States, residing at Bridgeport, county of Fairfield, State of Connecticut, have invented a new and useful Brake, of which the following is a specification.

My invention has for its object to provide an easily-operated and quick-acting brake adapted for general use upon machinery and upon vehicles generally, as wagons and cars, and especially adapted for use upon motor-vehicles driven by any of the various types of engines or motors in which the requirement is for a simple, strong, durable, inexpensive, and quick-acting brake that will work at all times without regard to weather conditions or to the position of the vehicle and will act effectively whether the vehicle is moving forward or backward.

In order to accomplish the desired result, I have devised the novel brake, comprising a rotary disk, a brake-band inclosing said disk and connected to the frame, and novel operating connections whereby both ends of the brake-band may be drawn toward each other, which I will now describe, referring to the accompanying drawings, forming part of this specification, and using reference characters to designate the several parts.

Figure 1:
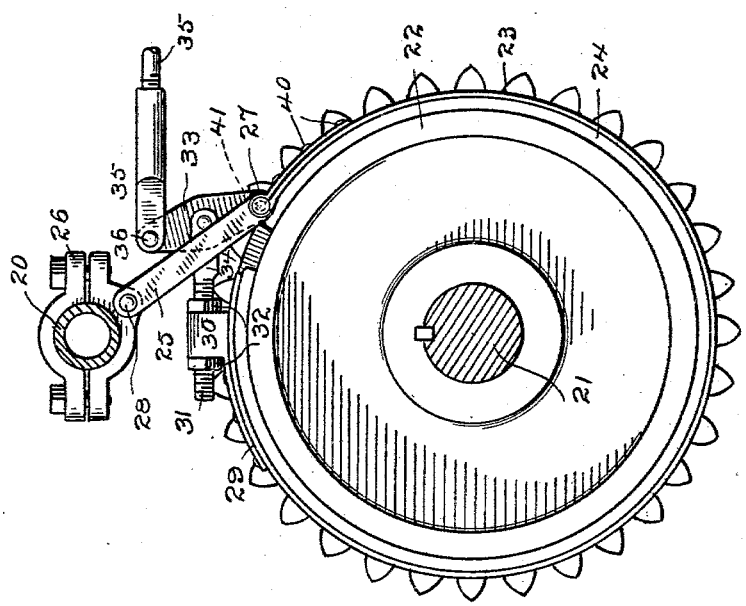

Figures 1 and 3 are sections of an axle, showing a brake-disk and brake-band and variant forms of my novel operating connections in side elevation; and Figs. 2 and 4 are views showing the axle in elevation, said variant forms of my novel operating connections appearing in front elevation.

20 denotes a fixed portion of the framework, 21 an axle, 22 a brake-disk rigidly secured to said axle, 23 a brake-band inclosing the disk, and 24 a brake-pad, which may or may not be used intermediate the brake-band and the disk. One end of the brake-band is attached to the frame, so that when braking the operating connections will be entirely relieved from the strain of the brake-disk upon the brake-band, all power applied to the operating connections being thus utilized in tightening the brake-band about the brake-disk.

The connection of the brake-band to the frame may be made in various ways without departing from the principle of my invention. In Figs. 3 and 4 I have shown this connection as made by means of a plate 38, one end of which is riveted to the brake-band and the other to a clip 39, which incloses a portion of the frame, and in Figs. 1 and 2 I have shown the connection as made by means of a link or links 25, two being shown in the drawings. The ends of these links are shown as pivoted, respectively, to the brake-band and to a clip 26, which incloses a portion of the frame, said pivotal points being indicated, respectively, by 27 and 28. At the other end of the brake-band is rigidly secured a plate 29, having a boss 30, with an opening through it. A threaded shank 31, carrying a yoke 34, passes through this opening and is locked at any required adjustment by means of nuts 32 on opposite side of the boss.

33 denotes an operating-lever, which is pivoted intermediate its ends to yoke 34. The ends of the operating-lever are pivoted to an operating-rod 35 and to the opposite end of the brake-band to which it is intermediately pivoted, the pivotal points at the ends being indicated, respectively, by 36 and 37. The special mode in which the operating-lever and the links, if used, are connected to the brake-band is wholly unimportant, so far as the principle of my invention is concerned.

In Figs. 1 and 2 I have shown the end of the brake-band to which the links and the operating-lever are pivoted as turned backward upon itself and riveted, as at 40, and said lever and links as pivoted on a rod 41, which is inclosed in the loop of the brake-band. (See dotted lines, Figs. 1 and 2.)

In Figs. 3 and 4, in which the links are dispensed with, the operating-lever is pivoted to a lug or lugs 42 upon plate 38, said plate being also shown as provided with a hole 43, through which the yoke and threaded shank may pass.

It will be obvious in view of the above description that the details of construction may be greatly varied without departing from the principle of my invention.

The operation will be apparent at a glance. The drawings show clearly that a pull upon the operating-rod will draw the pivotal point of the brake-lever in the direction of the pull, said pivotal point of the brake-lever being a yoke connected to one end of the brake-band, and that the opposite end of the brake-lever, which is pivoted to the opposite end of the brake-band, will be moved in the direction opposite to the pull, so that both ends of the brake-band will be drawn toward each other and caused to tighten about the brake-disk.

Having thus described my invention, I claim—

1. A brake comprising a rotary disk, a brake-band inclosing said disk, a connection between one end of said band and a fixed support said connection being formed to prevent movement of that end of the band toward or away from said fixed support, an operating-lever and an operating-rod, one end of said lever being pivoted to the operating-rod and the other to the brake-band, and the other end of the brake-band being pivoted to the lever at an intermediate point.

2. A brake comprising a rotary disk, a brake-band inclosing said disk, a link whose ends are pivotally connected to one end of the brake-band and to a fixed support, and formed to prevent movement of that end of the band toward or away from said fixed support, an operating-lever and an operating-rod, one end of said operating-lever being pivoted to the operating-rod and the other to the brake-band, and the other end of the brake-band being pivotally connected to the lever at an intermediate point.

3. A brake comprising a rotary disk, a brake-band inclosing said disk, a link whose ends are pivotally connected to one end of the brake-band and to a fixed support, and formed to prevent movement of that end of the band toward or away from said fixed support, an operating-lever and an operating-rod, one end of said operating-lever being pivoted to the operating-rod and the other to the brake-band, and the other end of the brake-band being provided with a yoke to which the operating-lever is pivoted.

In testimony whereof I affix my signature in presence of two witnesses.

ARTHUR H. RAYMOND.

Witnesses:
A. M. WOOSTER,
S. W. ATHERTON.